(12) United States Patent
Bauerle et al.

(10) Patent No.: US 7,576,164 B2
(45) Date of Patent: Aug. 18, 2009

(54) CURABLE BASE-RESISTANT FLUOROELASTOMERS

(75) Inventors: John G. Bauerle, Wilmington, DE (US); Christopher J. Bish, Kennett Square, PA (US); Theresa M. Dobel, Akron, OH (US); Phan L. Tang, West Chester, PA (US)

(73) Assignee: Du Pont Performance Elastomers LLC., Wilmington, DE (US)

( * ) Notice: Subject to any disclaimer, the term of this patent is extended or adjusted under 35 U.S.C. 154(b) by 0 days.

(21) Appl. No.: 11/712,250

(22) Filed: Feb. 27, 2007

(65) Prior Publication Data

US 2008/0207861 A1 Aug. 28, 2008

(51) Int. Cl.
*C08F 12/20* (2006.01)
*C08F 114/18* (2006.01)

(52) U.S. Cl. .................... 526/242; 524/544; 524/545; 524/546; 524/547; 524/551; 524/570; 524/800; 526/247; 526/249; 526/250; 526/253; 526/255; 526/291; 526/292.9; 526/294; 526/296; 526/332; 526/348.8; 526/348

(58) Field of Classification Search ........... 526/247, 526/250
See application file for complete search history.

(56) References Cited

U.S. PATENT DOCUMENTS

| 4,214,060 | A | 7/1980 | Apotheker et al. |
|---|---|---|---|
| 4,882,390 | A | 11/1989 | Kolb |
| 4,912,171 | A | 3/1990 | Grootaert et al. |
| 4,957,975 | A | 9/1990 | Carlson et al. |
| 5,648,429 | A | 7/1997 | Chiodini et al. |
| 6,703,450 | B2 | 3/2004 | Bauerle et al. |
| 2003/0065132 | A1* | 4/2003 | Bauerle et al. ............ 528/401 |
| 2003/0225189 | A1* | 12/2003 | Fuller ..................... 523/176 |

* cited by examiner

*Primary Examiner*—Marc S. Zimmer
*Assistant Examiner*—Nicole M Buie

(57) ABSTRACT

Compositions of fluoroelastomers containing copolymerized units of tetrafluoroethylene, propylene, a first cure site selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene, and a second cure site selected from the group consisting of i) copolymerized units of a brominated cure site monomer, ii) copolymerized units of an iodinated cure site monomer, iii) copolymerized units of a chlorinated cure site monomer, iv) brominated endgroups, v) iodinated endgroups and vi) a combination of any of i)-v) are readily curable with polyhydroxy curing systems. The resulting cured articles have a combination of excellent resistance to alkaline fluids, superior tensile properties and compression set resistance, and excellent adhesion to metal substrates. Optionally, the fluoroelastomers may be dual cured by both a polyhydroxy system and an organic peroxide system.

15 Claims, No Drawings

CURABLE BASE-RESISTANT FLUOROELASTOMERS

FIELD OF THE INVENTION

This invention relates to polyhydroxy curable fluoroelastomer compositions wherein the fluoroelastomer comprises copolymerized units of tetrafluoroethylene, propylene, a first cure site selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene and wherein the fluoroelastomer contains a second cure site selected from the group consisting of i) copolymerized units of a brominated cure site monomer, ii) copolymerized units of an iodinated cure site monomer, iii) copolymerized units of a chlorinated cure site monomer, iv) brominated endgroups, v) iodinated endgroups and vi) a combination of any of i)-v).

BACKGROUND OF THE INVENTION

Fluoroelastomers made from copolymers of tetrafluoroethylene (TFE), propylene (P), and optionally vinylidene fluoride ($VF_2$) (i.e. TFE/P dipolymers or $VF_2$/TFE/P terpolymers) are often utilized in applications wherein resistance to alkaline fluids and other high pH chemicals is critical. The TFE/P dipolymers have the best resistance to alkaline fluids. Terpolymers containing more than about 10 wt. % vinylidene fluoride units generally do not have significantly better alkaline fluid resistance than do conventional fluoroelastomers made from copolymers of vinylidene fluoride, hexafluoropropylene and tetrafluoroethylene.

In order to fully develop physical properties such as tensile strength, elongation, and compression set, elastomers must be cured, i.e. crosslinked. In the case of fluoroelastomers, this is generally accomplished by mixing uncured polymer (i.e. fluoroelastomer gum) with a polyfunctional curing agent and heating the resultant mixture under pressure, thereby promoting chemical reaction of the curing agent with active sites along the polymer backbone or side chains. Interchain linkages produced as a result of these chemical reactions cause formation of a crosslinked polymer composition having a three-dimensional network structure. Commonly used curing agents for fluoroelastomers include difunctional nucleophilic reactants, such as polyhydroxy compounds. Alternatively, peroxidic curing systems containing organic peroxides and unsaturated coagents, such as polyfunctional isocyanurates, may be employed.

In many cases, polyhydroxy and peroxide cure processes or curing agent formulations are unsatisfactory when used to crosslink these fluoroelastomers. For example, it is known to cure elastomeric $VF_2$/TFE/P terpolymers with either peroxide (U.S. Pat. No. 4,910,260) or polyhydroxy (U.S. Pat. Nos. 4,882,390 and 4,912,171) cure systems. However, when such compositions are cured using a polyhydroxy compound, the cured products may exhibit undesirably high compression set. In fact, such fluoroelastomers which contain less than about 10 wt. % copolymerized units of vinylidene fluoride show little to no cure response with polyhydroxy cure formulations.

Peroxide cures of elastomeric terpolymers of TFE/P/bromine atom containing cure site monomer that are disclosed in U.S. Pat. No. 4,910,260 are undesirable because the curable compositions which are initially formed are extremely scorchy and would therefore be unsuitable for many commercial processes.

Polyhydroxy cured elastomeric terpolymers of tetrafluoroethylene, propylene, and a cure site monomer selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene that are disclosed in U.S. Pat. No. 6,703,450 B2 have good cure characteristics and tensile properties. However, the elastomers do not adhere well to metal surfaces. Thus, these polymers may not be useful in some applications such as automotive shaft seals.

It would be particularly desirable to have an improved fluoroelastomer that is resistant to alkaline fluids, which readily crosslinks with polyhydroxy cure systems to form cured articles having good tensile properties and compression set resistance and which can adhere to metal surfaces.

SUMMARY OF THE INVENTION

It has been surprisingly found that the curing characteristics, physical properties and adhesion to metal substrates of TFE/P copolymers improve by incorporation of both a first cure site of copolymerized units of a cure site monomer selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene and a second cure site selected from the group consisting of i) copolymerized units of a brominated cure site monomer, ii) copolymerized units of an iodinated cure site monomer, iii) copolymerized units of a chlorinated cure site monomer, iv) brominated endgroups, v) iodinated endgroups and vi) a combination of any of i)-v).

Accordingly, an aspect of this invention is a fluoroelastomer comprising 35 to 75 mole percent copolymerized units of tetrafluoroethylene; 20 to 60 mole percent copolymerized units of propylene; 0.05 to 12 mole percent copolymerized units of a first cure site selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene; and 0.05 to 4 mole percent of a second cure site selected from the group consisting of i) copolymerized units of a brominated cure site monomer, ii) copolymerized units of an iodinated cure site monomer, iii) copolymerized units of a chlorinated cure site monomer, iv) brominated endgroups, v) iodinated endgroups and vi) a combination of any of i)-v).

Another aspect of the present invention is a curable fluoroelastomer composition comprising A) a fluoroelastomer comprising 35 to 75 mole percent copolymerized units of tetrafluoroethylene; 20 to 60 mole percent copolymerized units of propylene; 0.05 to 12 mole percent copolymerized units of a first cure site selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene; and 0.05 to 4 mole percent of a second cure site selected from the group consisting of i) copolymerized units of a brominated cure site monomer, ii) copolymerized units of an iodinated cure site monomer, iii) copolymerized units of a chlorinated cure site monomer, iv) brominated endgroups, v) iodinated endgroups and vi) a combination of any of i)-v);

B) 0.1 to 20 parts by weight per 100 parts fluoroelastomer of a polyhydroxy curing agent;

C) 1 to 30 parts by weight per 100 parts fluoroelastomer of an acid acceptor; and D) 0.1 to 20 parts by weight per 100 parts fluoroelastomer of a vulcanization accelerator.

The polyhydroxy curing agent and vulcanization accelerator may be present as separate components or as the salt of the curing agent and accelerator.

DETAILED DESCRIPTION OF THE INVENTION

Fluoroelastomers of this invention include the copolymer of tetrafluoroethylene (TFE), propylene (P), a first cure site selected from the group consisting of i) trifluoroethylene (TrFE), ii) 3,3,3-trifluoropropene-1 (TFP), iii) 1,2,3,3,3-pentafluoropropylene (1-HPFP) iv) 1,1,3,3,3-pentafluoropropylene (2-HPFP), and v) 2,3,3,3-tetrafluoropropene, and wherein the copolymer also contains a second cure site selected from the group consisting of i) copolymerized units of a brominated cure site monomer, ii) copolymerized units of an iodinated cure site monomer, iii) copolymerized units of a chlorinated cure site monomer, iv) brominated endgroups, v) iodinated endgroups and vi) a combination of any of i)-v).

Generally the fluoroelastomers of this invention contain between 35 to 75 (preferably between 39 to 73, most preferably 50 to 73) mole percent copolymerized units of tetrafluoroethylene, based on the total moles of copolymerized monomers in the fluoroelastomer. Less TFE causes the polymerization to be slow, while more TFE causes the resulting polymer to be plastic, rather than elastomeric.

The fluoroelastomers of this invention typically contain between 20 to 60 (preferably between 24 to 45, most preferably 30 to 38) mole percent copolymerized units of propylene, based on the total moles of copolymerized monomers in the fluoroelastomer. Less propylene causes the polymer to become plastic, while more propylene causes the polymerization to become slow.

Fluoroelastomers of this invention also contain 0.05 to 12 (preferably 1 to 8, most preferably 1.5 to 5) mole percent, based on the total number of moles of copolymerized monomers in the fluoroelastomer, of a first cure site in the form of copolymerized units of a cure site monomer. The cure site monomer is selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene. The monomer 3,3,3-trifluoropropene-1 is especially preferred. The first cure site facilitates curing of the fluoroelastomer with a polyhydroxy curing agent.

Fluoroelastomers of this invention contain a total of 0.05 to 4 (preferably 0.25 to 1.5) mole percent of a second cure site, based on the total number of moles of copolymerized monomers in the fluoroelastomer. The second cure site is selected from the group consisting of i) copolymerized units of a brominated cure site monomer, ii) copolymerized units of an iodinated cure site monomer, iii) copolymerized units of a chlorinated cure site monomer, iv) brominated endgroups, v) iodinated endgroups and vi) a combination of any of i)-v).

The presence of the second cure site permits the fluoroelastomers of this invention to be cured by organic peroxides in addition to polyhydroxy curatives. However, surprisingly, the presence of an organic peroxide is not necessary in order to improve the adhesion of the fluoroelastomers of the invention to metal substrates.

By "brominated, iodinated and chlorinated cure site monomer" is meant a copolymerizable vinyl olefin or vinyl ether that contains at least one C—Br, C—I, or C—Cl bond, respectively.

Specific examples of brominated cure site monomers include, but are not limited to bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1; 3,3-difluoroallyl bromide; 2-bromo-perfluoroethyl perfluorovinyl ether and fluorinated compounds of the class $CF_2Br$—$R_f$—O—$CF=CF_2$ ($R_f$ is a perfluoroalkylene group), such as $CF_2=CFOCF_2CF_2CF_2OCF_2CF_2Br$; $CF_2BrCF_2O$—$CF=CF_2$, and fluorovinyl ethers of the class $ROCF=CFBr$ or $ROCBr=CF_2$ (where R is a lower alkyl group or fluoroalkyl group) such as $CH_3OCF=CFBr$ or $CF_3CH_2OCF=CFBr$. A preferred brominated cure site monomer is 4-bromo-3,3,4,4-tetrafluorobutene-1 (BTFB).

Suitable iodinated cure site monomers include, but are not limited to $CHR=CH-Z-CH_2CHR-I$, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959; $I(CH_2CF_2CF_2)_nOCF=CF_2$ and $ICH_2CF_2O[CF(CF_3)CF_2O]_nCF=CF_2$, and the like, wherein n=1-3, such as disclosed in U.S. Pat. No. 5,717,036; iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045; allyl iodide and 2-iodoperfluoroethyl perfluorovinyl ether.

Suitable chlorinated cure site monomers include the chlorinated form of any of the brominated or iodinated cure site monomers shown above.

In addition to, or instead of a brominated, iodinated or chlorinated cure site monomer, iodinated or brominated endgroups may optionally be present at one or both of the fluoroelastomer polymer chain ends as a result of the use of bromine or iodine atom containing chain transfer or molecular weight regulating agents during preparation of the fluoroelastomers. The chain transfer agent is typically of the formula $RX_n$, where R may be a $C_1$-$C_3$ hydrocarbon, a $C_1$-$C_6$ fluorohydrocarbon, a $C_1$-$C_6$ chlorofluorohydrocarbon or a $C_2$-$C_8$ perfluorocarbon, X is iodine or bromine, and n=1 or 2 (U.S. Pat. Nos. 3,707,529 and 4,243,770). Such agents include those of formula $CH_2X_2$ where X is I or Br; $X(CF_2)_nY$ where X is I or Br, Y is I or Br (preferably both X and Y are I) and n is an integer between 3 and 10.

Specific examples include methylene iodide; 1,3-diiodoperfluoropropane; 1,4-diiodoperfluorobutane; 1,6-diiodoperfluorohexane; 1,8-diiodoperfluorooctane; 1,10-diiodoperfluorodecane; and 1-iodo-nonafluorobutane. Other chain transfer agents such as those of formula $RBr_nI_m$ (R is as defined above; n and m each are 1 or 2) may also be used. Particularly preferred are diiodinated perfluoroalkane chain transfer agents and mixtures thereof.

A particularly preferred fluoroelastomer comprises copolymerized units of tetrafluoroethylene, propylene, 3,3,3-trifluoropropene-1 and BTFB in the amounts specified above.

Preferably, the fluoroelastomers employed in this invention do not contain any copolymerized units of vinylidene fluoride. However, the fluoroelastomers may, optionally, contain up to 25 mole percent copolymerized units of vinylidene fluoride ($VF_2$), based on the total number of moles of copolymerized monomers in the fluoroelastomer. If the fluoroelastomer does contain units of vinylidene fluoride, the level is preferably 2 to 25 (most preferably between 10 and 20) mole percent. Generally, the lower the level of vinylidene fluoride, the better the fluoroelastomer's resistance to alkaline fluids (also referred to as "base resistance" in the art). However, copolymers of TFE and P containing no vinylidene fluoride units generally have poor resistance to hydrocarbon fluids such as oils or fuels. The addition of $VF_2$ to the fluoroelastomer increases the fluorine atom content and thus improves the resistance to hydrocarbons, but at the same time reduces the resistance of the fluoroelastomer to polar fluids. Depending upon the end use application environment, fluoroelastomer base resistance and hydrocarbon fluid resistance can be balanced by adjusting the level of copolymerized vinylidene fluoride and tetrafluoroethylene in the fluoroelastomer.

The fluoroelastomers of this invention are generally prepared by free radical emulsion or suspension polymerization. Preferably, the polymerizations are carried out in batch, or semi-batch emulsion processes well known in the art. The resulting fluoroelastomer latexes are usually coagulated by addition of electrolytes. The precipitated polymer is washed with water and then dried, for example in an air oven, to produce a substantially dry fluoroelastomer gum.

In a semi-batch emulsion polymerization process, a gaseous monomer mixture of a desired composition (initial monomer charge) is introduced into a reactor which contains an aqueous solution. The aqueous solution contains a surfactant such as ammonium perfluorooctanoate or perfluorohexylethyl sulfonic acid. Generally, the pH of the solution is controlled to between 1 and 7 (preferably 3-7), depending upon the type of fluoroelastomer being made. In addition, the initial aqueous solution may contain a nucleating agent, such as a fluoroelastomer seed polymer prepared previously, in order to promote fluoroelastomer latex particle formation and thus speed up the polymerization process.

The initial monomer charge contains a quantity of TFE, P, first cure site monomer and, optionally, one or more additional monomers such as $VF_2$. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring.

The temperature of the semi-batch reaction mixture is maintained in the range of 25° C.-130° C., preferably 50° C.-100° C. Polymerization begins when the initiator either thermally decomposes or reacts with reducing agent and the resulting radicals react with dispersed monomer.

Additional quantities of the gaseous major monomers and first cure site monomer (incremental feed) are added at a controlled rate throughout the polymerization in order to maintain a constant reactor pressure at a controlled temperature.

Bromine, iodine or chlorine atom containing cure site monomer is typically not introduced into the reactor until after the polymerization reaction has been initiated. It is then fed at a controlled rate based on the total amount of gaseous monomer being consumed.

Polymerization times in the range of from 2 to 60 hours are typically employed in this semi-batch polymerization process.

Curable compositions of this invention contain 1) a fluoroelastomer, as defined above, 2) a polyhydroxy curative, 3) an acid acceptor and 4) a vulcanization (or curing) accelerator. The curable compositions of this invention may, optionally, also contain an organic peroxide and a multifunctional curing coagent. Cured articles resulting from the latter compositions contain crosslinks due to both the polyhydroxy and peroxide curing systems and are sometimes referred to in the art as dual cured elastomers.

The curable compositions of the invention contain between 0.1 to 20 parts by weight (preferably 1-3 parts) of polyhydroxy crosslinking agent (or a derivative thereof) per 100 parts fluoroelastomer. Typical polyhydroxy cross-linking agents include di-, tri-, and tetrahydroxybenzenes, naphthalenes, and anthracenes, and bisphenols of the formula

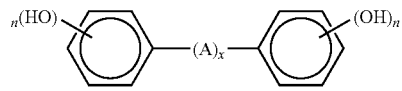

where A is a difunctional aliphatic, cycloaliphatic, or aromatic radical of 1-13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxy-benzene) (i.e. bisphenol AF or BPAF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

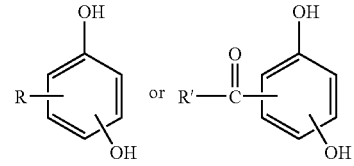

where R is H or an alkyl group having 1-4 carbon atoms or an aryl group containing 6-10 carbon atoms and R' is an alkyl group containing 1-4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethyl-hydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$-$R_4$ are $C_1$-$C_8$ alkyl groups and at least three of $R_1$—$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. After filtration, the tetraalkylammonium/BPAF salt may be isolated from solution by evaporation of the methanol. Alternatively, a methanolic solution of tetraalkylammonium hydroxide may be employed in place of the solution of quaternary ammonium salt, thus eliminating the precipitation of an inorganic salt and the need for its removal prior to evaporation of the solution.

In addition, derivatized polyhydroxy compounds such as mono- or diesters, and trimethylsilyl ethers are useful crosslinking agents. Examples of such compositions include, but are not limited to resorcinol monobenzoate, the diacetate of bisphenol AF, the diacetate of sulfonyl diphenol, and the diacetate of hydroquinone.

The curable compositions of the invention also contain between 1 to 30 parts by weight (preferably 1 to 7 parts) of an acid acceptor per 100 parts fluoroelastomer. The acid acceptor is typically a strong organic base such as Proton Sponge® (available from Aldrich) or an oxirane, or an inorganic base such as a metal oxide, metal hydroxide, or a mixture of 2 or more of the latter. Metal oxides or hydroxides which are useful acid acceptors include calcium hydroxide, magnesium oxide, lead oxide, zinc oxide and calcium oxide. Calcium hydroxide and magnesium oxide are preferred.

Vulcanization accelerators which may be used in the curable compositions of the invention include tertiary sulfonium salts such as $[(C_6H_5)_2S^+(C_6H_{13})][Cl]^-$, and $[(C_6H_{13})_2S(C_6H_5)]^+[CH_2CO_2]^-$ and quaternary ammonium, phosphonium, arsonium, and stibonium salts of the formula $R_5R_6R_7R_8Y^+ X^-$, where Y is phosphorous, nitrogen, arsenic, or antimony; $R_5$, $R_6$, $R_7$, and $R_8$ are individually $C_1$-$C_{20}$ alkyl, aryl, aralkyl, alkenyl, and the chlorine, fluorine, bromine, cyano, —OR, and —COOR substituted analogs thereof, with R being $C_1$-$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltriphenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino) phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenyl-phosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.1 and 20 parts by weight per hundred parts by weight fluoroelastomer. Preferably, 0.5-3.0 parts accelerator per hundred parts fluoroelastomer is employed.

Optionally, the curable compositions of the invention may contain a second curing agent in the form of a combination of an organic peroxide and a multifunctional (i.e. polyunsaturated) coagent compound. Examples of organic peroxides which are particularly effective curing agents for fluoroelastomers include dialkyl peroxides or bis(dialkyl peroxides) which decompose at a temperature above 50° C. In many cases one will prefer to use a di-t-butylperoxide having a tertiary carbon atom attached to a peroxy oxygen. Among the most useful are 2,5-dimethyl-2,5-di(t-butylperoxy)hexyne-3 and 2,5-dimethyl-2,5-di(t-butyl-peroxy)hexane. Other peroxides can be selected from such compounds as dicumyl peroxide, dibenzoyl peroxide, t-butyl perbenzoate, and di[1, 3-dimethyl-3-(t-butyl-peroxy)butyl]carbonate. Multifunctional coagents which cooperate with such peroxides to provide curing systems include methacrylates, allyl compounds, divinyl compounds, and polybutadienes. Specific examples of coagents include one or more of the following compounds: triallyl cyanurate; triallyl isocyanurate; tris(diallylamine-s-triazine); triallyl phosphite; hexaallyl phosphoramide, N,N-diallyl acrylamide; N,N,N'N'-tetraallyl terephthalamide; N,N,N',N'-tetraallyl malonamide; trivinyl isocyanurate; 2,4, 6-trivinylmethyltrisiloxane; and tri(5-norbornene-2-methylene)cyanurate. If a peroxide cure system is present in the compounds of the invention, the organic peroxide is generally at a level between 0.2 to 7 parts by weight (preferably 0.5 to 3 parts) per 100 parts fluoroelastomer and the coagent is present at a level of 0.1 to 10 (preferably 0.5 to 5) parts by weight per 100 parts fluoroelastomer.

The curable composition of the invention may contain other additives, commonly used in elastomer compounding and processing. The latter may be introduced into the composition before addition of the curative, simultaneously with it, or following the addition. Typical additives include fillers, plasticizers, processing aids, antioxidants, pigments, and the like. The amount of such ingredients which is added will depend on the particular end use applications for which the cured compositions are adapted. Fillers, such as carbon black, clays, barium sulfate, calcium carbonate, magnesium silicate, and fluoropolymers are generally added in amounts of from 5-100 parts by weight per 100 parts fluoroelastomer. The amount of plasticizer used is generally from 0.5-5.0 parts by weight per 100 parts fluoroelastomer. Typical plasticizers include esters, such as dioctyl phthalate and dibutyl sebacate. Processing aids are generally used in amounts of from 0.1-2.0 parts by weight per 100 parts fluoroelastomer. Suitable processing aids include octadecylamine, tetramethylene sulfone, p-chlorophenyl sulfone, and waxes, for example, carnauba wax, that aid in the processing of the compositions.

The fluoroelastomer, polyhydroxy curative, acid acceptor, accelerator and any other ingredients are generally incorporated into the curable compositions of the invention by means of an internal mixer or rubber mill. The resulting composition may then be shaped (e.g. molded or extruded) and cured. Curing typically takes place at about 150°-200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded article is heated in an oven or the like for an additional period of about 1-48 hours, typically from about 180°-275° C., generally in an air atmosphere.

The polymers of the invention and curable compositions of the invention result in cured fluoroelastomer articles which have unusually good base resistance, tensile properties, compression set resistance and adherence to metal surfaces. Such articles find application as gaskets, seals and tubing, particularly in automotive end uses such as shaft seals.

The invention is now illustrated by the following embodiments in which all parts are by weight unless otherwise indicated.

EXAMPLES

Test Methods

Physical properties of the compositions described in the examples were measured according to the following test procedures.

| | |
|---|---|
| Tensile Strength ($T_B$) | ASTM D412 |
| Modulus ($M_{100}$) | ASTM D412 |
| Elongation at Break ($E_B$) | ASTM D412 |
| Compression Set-B | ASTM D395 |

Adhesion to metal substrates was measured using hot pulls by hand. In this test, metal coupons (2.54 cm×5.72 cm×2 mm) were grit blasted, solvent wiped and then coated with a 50 weight percent solution of CHEMLOK® 5150 adhesive (available from Lord Corporation) in methanol. Coupons were air dried. Sheets of fluoroelastomer compositions were compression molded onto coupons (10 minutes at 177° C.). Coupons were then removed from the press and immediately put in a vice and pulled by hand, while the coupons were still hot. The point of failure was noted, either stock tear (i.e. failure within the cured fluoroelastomer), or bond failure (i.e. failure at the interface between the fluoroelastomer and metal surface).

Control A

A fluoroelastomer control (Polymer A) was prepared by a semi-batch emulsion polymerization, carried out at 60° C. in a well-stirred reaction vessel. A 33-liter, horizontally agitated reactor was charged with 23 liters of deionized, deoxygenated water, 115 g of perfluorohexylethyl sulfonic acid and 28.8 g of isopropanol. The reactor was heated to 60° C. and then pressurized to 2.07 MPa with a mixture of 96.0 wt. % TFE, 2.0 wt. % TFP and 2.0 wt. % P. A 543 ml aliquot of an aqueous initiator solution containing 10 wt. % ammonium persulfate was then added. A mixture of 76.0 wt. % TFE, 20.0 wt. % P, 4.0 wt. % TFP was supplied to the reactor to maintain a pressure of 2.07 MPa throughout the polymerization. The initiator solution was fed continuously at 10 ml/hour through the end of the reaction period. After a total of 8000 g monomer mixture had been supplied to the reactor, monomer addition was discontinued and the reactor was purged of residual monomer. The total reaction time was 22 hours. The resulting fluoroelastomer latex was coagulated by addition of aluminum potassium sulfate solution and then washed with deionized water. The polymer crumb was dried for two days at 60° C. The product, containing 76 wt. % (59.4 mol. %) TFE units, 20 wt. % (37.3 mol %) P units, and 4 wt. % (3.3 mol %) TFP units, had a Mooney viscosity, ML-10 (121° C.), of 55.

Control B

A fluoroelastomer control (Polymer B) was prepared by a semi-batch emulsion polymerization, carried out at 60° C. in a well-stirred reaction vessel. A 33-liter, horizontally agitated reactor was charged with 22 liters of deionized, deoxygenated water, 300 g of ZONYL® 1033D fluorosurfactant (available from DuPont), 10.4 g of sodium hydroxide and 7 g of isopropanol. The reactor was heated to 60° C. and then pressurized to 2.07 MPa with a mixture of 95.0 wt. % tetrafluoroethylene (TFE) and 5.0 wt. % propylene (P). A 540 ml aliquot of an aqueous 10 wt. % ammonium persulfate initiator solution was then added. A mixture of 75.6 wt. % TFE and 24.4 wt. % P was supplied to the reactor to maintain a pressure of 2.07 MPa throughout the polymerization. After 80 g of gaseous monomer had been fed to the reactor, a feed of 4-bromo-3,3,4,4-tetrafluorobutene-1 (BTFB) was begun at a rate of 42.2 ml per 3000 g gaseous monomer until 105.8 ml had been fed to the reactor. Additional initiator solution was fed continuously at 5 ml/hour through the end of the reaction period. After a total of 8000 g of monomer mixture had been supplied to the reactor, monomer addition was discontinued and the reactor was purged of residual monomer. The total reaction time was 24 hours. The resulting fluoroelastomer latex was coagulated by addition of aluminum sulfate solution, filtered and then washed with deionized water. The polymer crumb was dried for two days at 60° C. The product, composed of 74 wt. % (56.1 mol %) TFE units, 23.9 wt. % (43.1 mol %) P units, and 2.1 wt. % (0.77 mol %) BTFB units (based on composition of monomer feed), was an amorphous elastomer having a glass transition temperature of 2.1° C., as determined by differential scanning calorimetry (heating mode, 10° C./minute, inflection point of transition). Mooney viscosity, ML-10 (121° C.), was 73.1.

Example 1

A fluoroelastomer of the invention (Polymer 1) was prepared by a semi-batch emulsion polymerization, carried out at 60° C. in a well-stirred reaction vessel. A 33-liter, horizontally agitated reactor was charged with 22 liters of deionized, deoxygenated water, 383 g of ZONYL® 1033D fluorosurfactant, 10.4 g of sodium hydroxide and 21 g of isopropanol. The reactor was heated to 60° C. and then pressurized to 2.07 MPa with a mixture of 96.0 wt. % TFE, 2.0 wt. % P, and 2.0 wt. % 3,3,3-trifluoropropene-1 (TFP). A 540 ml aliquot of an aqueous 10 wt. % ammonium persulfate initiator solution was then added. A mixture of 78.4 wt. % TFE, 17.5 wt. % P, and 4.1 wt. % TFP was supplied to the reactor to maintain a pressure of 2.07 MPa throughout the polymerization. After 80 g of gaseous monomer had been fed to the reactor, a feed of 4-bromo-3,3,4,4-tetrafluorobutene-1 (BTFB) was begun at a rate of 35.1 ml per 3000 g gaseous monomer until 88.0 ml had been fed to the reactor. The initiator solution was fed continuously at 5 ml/hour through the end of the reaction period. After a total of 8000 g monomer mixture had been supplied to the reactor, monomer addition was discontinued and the reactor was purged of residual monomer. The total reaction time was 20 hours. The latex was coagulated by addition of aluminum sulfate solution and then washed with deionized water. The polymer crumb was dried for two days at 60° C. The product, containing 77 wt. % (62.6 mol %) TFE units, 17.2 wt. % (33.23 mol %) P units, 1.8 wt. % (0.71 mol %) BTFB units, and 4 wt. % (3.5 mol %) TFP units (based on composition of monomer feed), was an amorphous fluoroelastomer having a glass transition temperature of 3.8° C., as determined by differential scanning calorimetry (heating mode, 10° C./minute, inflection point of transition). Mooney viscosity, ML-10 (121° C.), was 51.1.

Example 2

Curable compositions of the invention (Samples 1 and 2) were made by mixing a fluoroelastomer of the invention (Polymer 1) with a salt of a polyhydroxy curative and vulcanization accelerator (1:1 molar ratio methyltributylammonium/bisphenol AF) and other ingredients on a conventional two-roll rubber mill, using standard mixing techniques employed in the elastomer industry. Comparative curable compositions (Samples A and B) were made by the same procedure except that control fluoroelastomer Polymer A (not containing BTFB cure site monomer units) was used in place of Polymer 1. Another comparable curable composition (Sample C) was made by mixing an organic peroxide curative with control Polymer B (not containing TFP cure site monomer units). The formulations are shown in Table I.

O-rings were made by press curing 10 minutes at 177° C. followed by an air oven post cure of 16 hours at 200° C. Physical properties, compression set resistance and adhesion were measured according to the Test Methods. The results are also shown in Table I.

TABLE I

| Ingredient, phr[1] | Comp. Sample A | Comp. Sample B | Comp. Sample C | Sample 1 | Sample 2 |
|---|---|---|---|---|---|
| Polymer 1 | 0 | 0 | 0 | 100 | 100 |
| Polymer A | 100 | 100 | 0 | 0 | 0 |
| Polymer B | 0 | 0 | 100 | 0 | 0 |
| Elastomag 170[2] | 8.2 | 8.2 | 0 | 8.2 | 8.2 |
| Wollastocoat 1022[3] | 0 | 41 | 0 | 0 | 41 |
| N990 carbon black | 31 | 0 | 30 | 31 | 0 |
| N762 carbon black | 0 | 2.1 | 0 | 0 | 2.1 |
| MTBAHAF[4] | 3 | 2.5 | 0 | 3 | 2.5 |
| Zinc Oxide | 0 | 0 | 3 | 0 | 0 |
| Peroxide[5] | 0 | 0 | 2.5 | 0 | 0 |
| Coagent[6] | 0 | 0 | 3 | 0 | 0 |
| Physical Properties | | | | | |
| $M_{100}$, MPa | 7.1 | 11.1 | 4.7 | 11.0 | 14.5 |
| $T_b$, MPa | 12.5 | 13.0 | 12.2 | 16.2 | 15.4 |
| $E_b$, % | 212 | 159 | 242 | 176 | 128 |
| Compression Set | | | | | |
| 70 hours @200° C., % | 32 | 30 | 57 | 32 | 32 |
| Adhesion | easily pulled apart | easily pulled apart | stock tear | stock tear | partial stock tear |

[1]phr is parts by weight per 100 parts by weight rubber (i.e. elastomer)
[2]Magnesium oxide available from Morton Performance Chemicals, Inc.
[3]calcium metasilicate mineral filler available from Nyco Minerals
[4]salt (1:1 molar ratio) of bisphenol AF curative and methyltributylammonium hydroxide
[5]Varox DBPH-50 available from Elf Atochem
[6]Diak 7 triallyl isocyanurate available from DuPont Performance Elastomers

What is claimed is:

1. An article comprising:
   A) a metal substrate; and
   B) a fluoroelastomer composition adhered to said metal substrate, said fluoroelastomer composition comprising
   i) a fluoroelastomer comprising 1) 35 to 75 mole percent copolymerized units of tetrafluoroethylene; 2) 20 to 60 mole percent copolymerized units of propylene; 3) 0.05 to 12 mole percent copolymerized units of a first cure site selected from the group consisting of trifluoroethylene; 3,3,3-trifluoropropene-1; 1,2,3,3,3-pentafluoropropylene; 1,1,3,3,3-pentafluoropropylene; and 2,3,3,3-tetrafluoropropene; and 4) 0.05 to 4 mole percent of a second cure site selected from the group consisting of a) copolymerized units of a brominated cure site monomer, b) copolymerized units of an iodinated cure site monomer, c) copolymerized units of a chlorinated cure site monomer, d) brominated endgroups, e) iodinated endgroups and f) a combination of any of a)-e);
   ii) 0.1 to 20 parts by weight per 100 parts fluoroelastomer of a polyhydroxy curing agent;
   iii) 1 to 30 parts by weight per 100 parts fluoroelastomer of an acid acceptor; and
   iv) 0.1 to 20 parts by weight per 100 parts fluoroelastomer of a vulcanization accelerator.

2. An article of claim 1 wherein said fluoroelastomer comprises copolymerized units of tetrafluoroethylene in an amount between 50 and 73 mole percent, copolymerized units of propylene in an amount between 30 and 38 mole percent; copolymerized units of said first cure site in an amount between 1.5 and 5 mole percent, and said second cure site in an amount between 0.25 and 1.5 mole percent.

3. An article of claim 1 wherein said second cure site is selected from the group consisting of $CF_2$=$CFOCF_2CF_2CF_2OCF_2CF_2Br$; 1-bromo-2,2-difluoroethylene; bromo-trifluoroethylene; 4-bromo-3,3,4,4-tetrafluorobutene-1; 4-bromo-1,1,2-trifluorobutene-1; 2-bromoperfluoro(ethyl vinyl)ether; and 3-bromoperfluoro(propyl vinyl)ether.

4. An article of claim 1 wherein said second cure site is selected from the group consisting of i) CHR=CH-Z-$CH_2$CHR—I, wherein R is —H or —$CH_3$; Z is a $C_1$-$C_{18}$ (per)fluoroalkylene radical; ii) I($CH_2CF_2CF_2$)$_n$OCF=$CF_2$, wherein n=1-3; iii) I$CH_2CF_2$O[CF($CF_3$)$CF_2$O]$_n$CF=$CF_2$, wherein n=1-3; iii) iodoethylene; iv) 4-iodo-3,3,4,4-tetrafluorobutene-1; v) 3-chloro-4-iodo-3,4,4-trifluorobutene; vi) 2-iodo-1,1,2,2-tetrafluoro-1-(vinyloxy)ethane; vii) 2-iodo-1-(perfluorovinyloxy)-1,1,-2,2-tetrafluoroethylene; viii) 1,1,2,3,3,3-hexafluoro-2-iodo-1-(perfluorovinyloxy) propane; ix) 2-iodoethyl vinyl ether; x) 3,3,4,5,5,5-hexafluoro-4-iodopentene; xi) iodotrifluoroethylene; xii) allyl iodide and xiii) 2-iodo-perfluoroethyl perfluorovinyl ether.

5. An article of claim 1 wherein said first cure site is copolymerized units of 3,3,3-trifluoropropene-1 and said second cure site is copolymerized units of 4-bromo-3,3,4,4-tetrafluorobutene-1.

6. An article of claim 1 wherein said fluoroelastomer composition further comprises v) 0.2 to 7 parts by weight per 100 parts fluoroelastomer of an organic peroxide and vi) 0.1 to 10 parts by weight per 100 parts fluoroelastomer of a multifunctional coagent.

7. An article of claim 1 wherein said polyhydroxy curing agent is a curing agent selected from the group consisting of i) dihydroxy-, trihydroxy-, and tetrahydroxy-benzenes, -naphthalenes, and -anthracenes;

ii) bisphenols of the formula

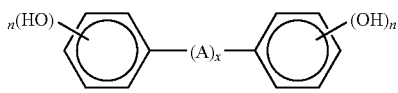

where A is a stable divalent radical; x is 0 or 1; and n is 1 or 2;
iii) dialkali salts of said bisphenols, iv) quaternary ammonium and phosphonium salts of said bisphenols, v) tertiary sulfonium salts of said bisphenols, and vi) esters of phenols.

8. An article claim 1 wherein said vulcanization accelerator is selected from the group consisting of quaternary ammonium salts, tertiary sulfonium salts an quaternary phosphonium salts.

9. An article of claim 1 wherein said vulcanization accelerator is selected from the group consisting of i) quaternary ammonium salts of said polyhydroxy crosslinking agent, ii) quaternary phosphonium salts of said polyhydroxy crosslinking agent and iii) tertiary sulfonium salts of said polyhydroxy crosslinking agent.

10. An article comprising:
A) a metal substrate; and
B) a fluoroelastomer composition adhered to said metal substrate, said fluoroelastomer composition comprising
i) a fluoroelastomer comprising 1) 35 to 75 mole percent copolymerized units of tetrafluoroethylene; 2) 20 to 60 mole percent copolymerized units of propylene; 3) 0.05 to 12 mole percent copolymerized units of a first cure site selected from the group consisting of trifluoroethylene; 3,3,3-trifluoropropene-1; 1,2,3,3,3-pentafluoropropylene; 1,1,3,3,3-pentafluoropropylene; and 2,3,3,3-tetrafluoropropene; and 4) 0.05 to 4 mole percent of a second cure site selected from the group consisting of a) copolymerized units of a brominated cure site monomer, b) copolymerized units of an iodinated cure site monomer, c) copolymerized units of a chlorinated cure site monomer, d) brominated endgroups, e) iodinated endgroups and f) a combination of any of a)-e);
ii) a compound selected from the group consisting of i) quaternary ammonium salts of a bisphenol, ii) quaternary phosphonium salts of a bisphenol and iii) tertiary sulfonium salts of a bisphenol; and
iii) an acid acceptor.

11. An article of claim 10 wherein said fluoroelastomer comprises copolymerized units of tetrafluoroethylene in an amount between 50 and 73 mole percent; copolymerized units of propylene in an amount between 30 and 38 mole percent; copolymerized units of said first cure site in an amount between 1.5 and 5 mole percent, and said second cure site in an amount between 0.25 to 1.5 mole percent.

12. An article of claim 10 wherein said second cure site is selected from the group consisting of $CF_2=CFOCF_2CF_2CF_2OCF_2CF_2Br$; 1-bromo-2,2-difluoroethylene; bromo-trifluoroethylene; 4-bromo-3,3,4,4-tetrafluorobutene-1; 4-bromo-1,1,2-trifluorobutene-1; 2-bromoperfluoro(ethyl vinyl)ether; and 3-bromoperfluoro(propyl vinyl)ether.

13. An article of claim 10 wherein said second cure site is selected from the group consisting of i) $CHR=CH-Z-CH_2CHR-I$, wherein R is —H or —$CH_3$; Z is a $C_1$-$C_{18}$ (per)fluoroalkylene radical; ii) $I(CH_2CF_2CF_2)_nOCF=CF_2$, wherein n=1-3; iii) $ICH_2CF_2O[CF(CF_3)CF_2 O]CF=CF_2$, wherein n=1-3; iii) iodoethylene; iv) 4-iodo-3,3,4,4-tetrafluorobutene-1, v) 3-chloro-4- iodo-3,4,4-trifluorobutene; vi) 2-iodo-1,1,2,2-tetrafluoro-1-(vinyloxy)ethane; vii) 2-iodo-1-(perfluorovinyloxy)-1,1,-2,2-tetrafluoroethylene; viii) 1,1,2,3,3,3-hexafluoro-2-iodo-1-(perfluorovinyloxy) propane; ix) 2-iodoethyl vinyl ether; x) 3,3,4,5,5,5-hexafluoro-4-iodopentene; xi) iodotrifluoroethylene; xii) allyl iodide and xiii) 2-iodo-perfluoroethyl perfluorovinyl ether.

14. An article of claim 10 wherein said first cure site is copolymerized units of 3,3,3-trifluoropropene-1 and said second cure site is copolymerized units of 4-bromo-3,3,4,4-tetrafluorobutene-1.

15. An article of claim 10 wherein said fluoroelastomer composition further comprises v) 0.2 to 7 parts by weight per 100 parts fluoroelastomer of an organic peroxide and vi) 0.1 to 10 parts by weight per 100 parts fluoroelastomer of a multifunctional coagent.

* * * * *